Patented Feb. 28, 1933

1,899,703

UNITED STATES PATENT OFFICE

ARTHUR LINDNER, OF STAAKEN NEAR SPANDAU, GERMANY, ASSIGNOR TO WESTINGHOUSE ELECTRIC & MANUFACTURING COMPANY, A CORPORATION OF PENNSYLVANIA

ELECTRIC MOTOR DRIVE FOR WELL DRILLING EQUIPMENT

Application filed November 12, 1931, Serial No. 574,514, and in Germany November 18, 1930.

This invention relates, generally, to control systems and more particularly to control systems for electrically operated well-drilling equipment.

As is general practice in well-drilling equipment for deep wells, the electric motor that operates the drill-table, for the purpose of economy and simplicity, is also used for many other operations, such, for example, as for pulling the drilling spindle and the string of casing during the hoisting operation. As is apparent, each of these operations, since they perform different services demand different power requirements.

The drilling operation requires a relatively small amount of motor torque, with an adjustable wide speed range, for the purpose of providing the proper drilling speed in accordance with the varying degree of hardness of the layers of rock.

Furthermore, for the drilling operation, care must be taken to prevent the motor from developing its full torque, otherwise the individual spindle sections will be unscrewed or the spindle will be twisted off.

Pulling of the drilling spindle, an operation performed by means of a hoist and a tackle, requires a relatively high motor torque, because this operation, which interrupts the actual drilling procedure, must be completed within the shortest possible time. The hoisting of the tubing or string of casing also impresses a heavy duty on the motor.

It is an object of this invention to so alter the torque characteristics of a motor that the torque requirements for the drilling and hoisting operations, respectively, may be secured.

It is also an object of this invention to provide a control system whereby a three-phase alternating-current may be automatically connected to a source of power in star-connection, when called upon to operate the drilling spindle and may be automatically connected to a source of power in delta-connection, when called upon to operate the hoisting equipment.

Other objects and advantages will hereinafter become apparent from a study of the following detailed specification, taken in conjunction with the accompanying drawings, in which.

To accomplish the objects above stated, the motor is equipped with special means which assures that the proper motor connections are employed for the various operations. In other words for the drilling operation the primary windings of the motor can be operated only in star-connection, and for the hoisting operation the said windings can be operated only in delta-connection. This can be accomplished by equipping the coupling or clutch members that are disposed between the hoist and drilling table with an auxiliary switch, and by connecting the contacts of this switch, through an interlock on the star-delta contactor, to the tripping circuit of the main line contactor in such way that the drilling table can be coupled with the hoist only when the motor driving the hoist operates in star-connection, whereas the main line contactor will be tripped and the motor disconnected from the line when the motor is delta-connected. As a consequence, it is impossible to have the delta-connected motor drive the drilling table.

Figure 1:
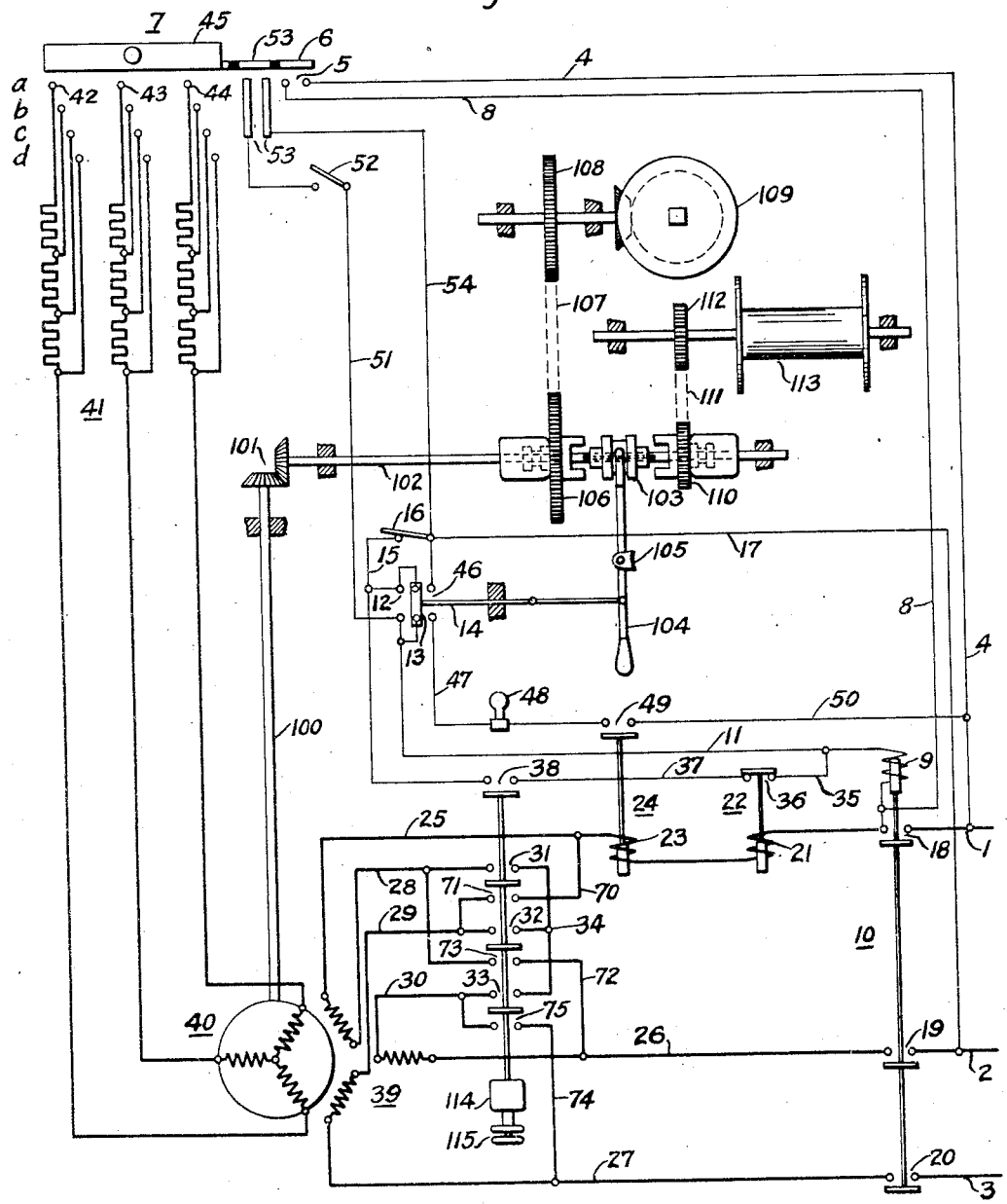
Figure 1 shows diagrammatically a system embodying the features of this invention, in combination with the drilling equipment to be operated.

Referring more particularly to Fig. 1 of the drawings, a drilling equipment embodying the drilling table 109 and a hoist drum 113 together with the necessary mechanical connections are shown associated with a slipring induction motor having primary windings 39 and secondary windings 40 connected to a suitable resistor 41, the value of which may be controlled, for speed control purposes, by the controller 7. As illustrated the motor is coupled to a shaft 100, and through a cooperative pair of bevel gears 101 and a shaft 102, is disposed to operate either the drill table 109 or the hoist drum 113, depending, however, upon the position of the clutch member 103 which is splined to the shaft 102.

The clutch member 103 may be operated by the lever 104 pivoted at 105. When the clutch member 103 is moved to the left, the jaws thereof engage the clutch jaws of the sprocket wheel 106, which is loosely mounted on the shaft 102. The drill table 109 may, therefore, be driven by the sprocket wheel 106 through the chain 107 and the sprocket wheel 108, and the bevel gear associated with the drill table. When it is desired to operate the hoist drum, the clutch member 103 is moved to the right, thereby operatively connecting the sprocket wheel 110, which is loosely mounted on the shaft 102, with the driving motor, whereupon the hoist drum 113 may be driven through the chain 111 and sprocket wheel 112.

To limit the torque of the motor when the drill table is operated, the clutch lever 104 is provided with a rod 14 for controlling circuit connections discussed more in detail hereinafter.

Assuming that the attendant wishes to operate the drill table 109, the clutch lever 104 is moved to the right, thereby clutching the sprocket wheel 106 to the clutch member 103. The motor is, therefore, connected to drive the drill table 109. To start the motor with the primary windings 39 star-connected, the manually operable switch 115 is moved upwardly to close the contact members 38, 31, 32 and 33, the switch 115 being held in the upper position by a latch member 114.

The manually operable controller 7 is also moved to bridge the contact fingers 42, 43, 44 by means of the bridging member 45. These operations establish a circuit from the energized conductors 1, 2 and 3, leading to a suitable source of three-phase alternating current (not shown) through conductor 4, contact fingers 5, bridged by the controller segment 6 of the controller 7, conductor 8, actuating coil 9 of the main line contactor 10, conductor 35, contact members 36 of the overload contactor 22, conductor 37, contact members 38 of the star-delta switch 115, conductor 15, stopping switch 16, and conductor 17 to the energized conductor 2. It will be noted that the energization of the actuating coil 9 of the main line contactor 10 cannot take place in any other position of the controller 7 but the first position, that is, when contact fingers 5 are bridged by the controller segment 6.

Operation of the main line contactor 10 establishes a holding circuit for the actuating coil 9 through the contact members 18, which, at this stage, shunts the contact members 5 and the circuits associated therewith. Operation of the main line contactor 10 also establishes a three phase circuit for the primary windings 39 of the motor. One phase of this circuit may be traced from energized conductor 1 through contact members 18, of the contactor 10, actuating coil 21 of the overload contactor 22, actuating coil 23 of the overload contactor 24, conductor 25, a portion of the primary windings 39, conductor 28, contact fingers 31 of the star-delta switch 115 to the junction 34; a second phase of this circuit may be traced from the energized conductor 2, contact fingers 19 of the contactor 10, conductor 26, a portion of the primary windings 39, conductor 30 and the contact fingers 33 of the star-delta switch 115 to the junction 34; and a third phase of this circuit may be traced from the energized conductor 3 through contact fingers 20 of the contactor 10, conductor 27, a portion of the primary windings 39, conductor 29 and contact members 32 of the star-delta switch 115 to the junction 34.

It will be noted that the neutral or the corresponding junctions of the primary windings 39 are all connected to the junction point 34, thus connecting the primary windings to the source of alternating current in star-circuit relation. The secondary windings of the motor that are connected to the resistor 41 may have their electrical characteristics changed by the controller 7, thereby providing a speed control for the motor, and, in consequence, for the drill table 109 over a considerable range.

Since the clutch member 103 is brought into cooperative relation with the clutch jaws on the sprocket wheel 106, the contact fingers 46 are bridged by the segment 13 connected to the rod 14. If, for any reason, the load on the motor increases above a predetermined amount, the overload contactor 24 will close its contact members 49, thereby establishing a circuit from the energized conductor 1 through conductor 50, contact members 49, signal light 48, conductor 47, contact fingers 46, bridged by the segment 13 and conductor 17 to the energized conductor 2. Should the attendant fail to heed the signal 48 within due time, this overload condition causes the overload contactor 22 to operate for interrupting the circuit that energizes the actuating coil 9 of the main line contactor 10 at the contact fingers 36. Accordingly, the equipment will be brought to rest without causing any damage to the drilling spindle.

If it is desired to hoist the drum spindle or to hoist the casing, the clutch member 103 is operated to engage the sprocket wheel 110 and the star-delta switch 115 is moved to the lower position, whereby the contact members 71, 73 and 75 are actuated to closed circuit position, and at the same time the contact members 38, 31, 32 and 33 are moved to open circuit position.

The controller 7 is moved to the starting position, whereby the contact fingers 5 are bridged by the controller segment 6, thereby establishing an energizing circuit for the actuating coil 9, which circuit may be traced from the energized conductor 8 through actuating coil 9, conductor 11, contact fingers 12, bridged by the segment 13 that is mounted on the rod 14, conductor 15, stop switch 16 and conductor 17 to the energized conductor 2.

Operation of the main line contactor 10 causes the energization of the primary windings 39, and hence the windings are connected in delta or closed circuit position by the contact fingers 71, 73 and 75. The conductor 1 is connected through conductors 25 and 70 and contact members 71 to a pair of terminals of two phases of the primary windings; conductor 2 is connected through conductors 26 and 72 and contact members 73, conductor 28 to a second pair of terminals of two phases of the primary windings 39, and conductor 3 is connected through conductors 27 and 74, contact members 75 and conductor 30 is connected to a third pair of terminals of two phases of the primary windings 39. The primary windings of the motor are, therefore, connected in delta circuit relation, and the torque characteristics of the motor are materially changed, that is, the torque at the motor shaft is very materially increased.

It will be noted that when the motor is mechanically coupled to the hoist drum 113, the primary windings 39 may be connected in star-circuit relation, the opposite however, is not true. That is to say, when the motor is mechanically coupled to the drill table, the delta-circuit connection cannot be established, since the contact members 38 of the star-delta switch 115 are essential to effect the operation of the main line contactor 10.

When it is desired to connect successive sections of the casing, a considerable torque is necessary at the drilling table. To make it possible to connect the motor in delta-circuit relation and yet have the motor shaft coupled to the drill table, a switch 52 is provided in the circuit with the contact strips 53. When the switch 52 is closed, the actuating coil 9 may be energized, even though the contact fingers 12 are not bridged by the segment 13. This circuit may be traced from the energized conductor 8 through the actuating coil 9 of the contactor 10, conductor 11, lower contact finger 12, conductor 51, switch 52, contact strips 53, bridged by the controller segment 53′ and conductors 54 and 17 to the energized conductor 2.

From the modification shown in Fig. 1 and the description thereof, it is apparent that the matter of the circuit connection for the primary winding is dependent upon the manual operation of the star-delta switch 115. It is, of course, obvious that the star-delta switch 115 may be manually interconected with a clutch lever 104, thereby making it impossible to operate the star-delta switch, except when the clutch member 103 is in the proper position.

Figure 2:
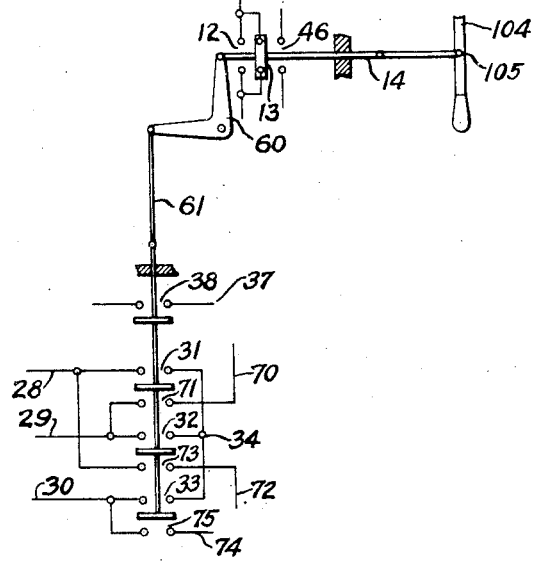
Fig. 2 shows diagrammatically a mechanical interlock between the clutch mechanism and the star-delta contactor.

In this connection, attention is called to the modification shown in Fig. 2 where the rod 14 is shown associated with the bell crank lever 60 pivoted at its support. The bell crank lever 60 operates a rod 61 which actuates the contact members of the star-delta switch. Obviously if the lever 104 is moved to the left, mechanically coupling the motor to the hoist drum, then none other but the delta-connection can be made for the primary windings of the motor, whereas if the lever 104 is moved to the right, thereby engaging the clutch member 103 with the sprocket wheel 106, only the star-connection can be made for the primary windings of the motor.

Figure 3:
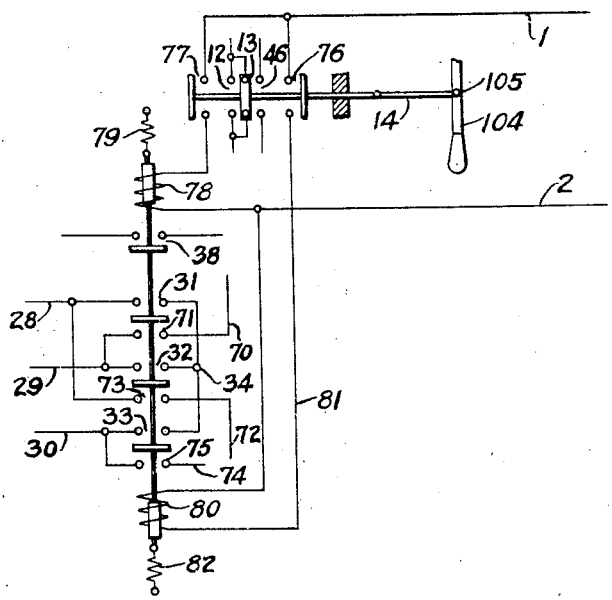
Fig. 3 shows diagrammatically how the star-delta contactor may be electromagnetically interlocked with the clutch mechanism.

While the modification shown in Fig. 2 may have advantages over the other modifications shown in some installations, yet in others where the star-delta contactor must of necessity be located remotely from the clutch member 103 an electromagnetic interlocking system may be utilized, such as shown in Fig. 3. In Fig. 3, the star-delta switch is shown balanced to a given open circuit position by the springs 79 and 82. If the clutch lever 104 is moved to the right, thereby coupling the motor to the drill table, the contact fingers 76 are bridged and a circuit is established from the energized conductor 1 through the contact finger 76, conductor 81 and the actuating coil 80 of the star-delta switch to the energized conductor 2. The star-delta switch is thereby moved to a lower position, and the primary windings of the motor are connected in delta-circuit relation. If the lever 104 is moved to the left, thereby mechanically coupling the motor to the hoist drum, a circuit is established from the energized conductor 1 through contact fingers 77 and actuating coil 78 of the star-delta switch to the energized conductor 2.

From the foregoing discussion of the modifications shown in Figs. 2 and 3, it is obvious that the wrong connection cannot be established when the clutch member is not in the proper position, and such connection is automatically assured by the mechanical interlock (see Fig. 2) and the electromagnetic interlock (see Fig. 3).

Although I have shown certain preferred embodiments of my invention, it is, of course, understood that the modifications shown and described are merely illustrative, and do not represent the only means for accomplishing the novel results inherent in this invention. It is, of course, apparent that other modifications may be devised to accomplish the novel results, and I, therefore, wish that this invention be limited only by the appended claims and the prior art.

I claim as my invention:

1. An electric motor drive for well-drilling equipment comprising, in combination, a drill table, a hoist, a motor having a polyphase winding, driving means including a coupling for connecting said motor to drive either the drill table or the hoist, a source of polyphase alternating-current and means controlled by said coupling for connecting the polyphase winding in star-circuit relation with said source when the coupling is such as to cause the motor to be in driving connection with the drill table.

2. An electric motor drive for well-drilling equipment comprising, in combination, a drill table, a hoist, a motor having a polyphase winding, driving means including a coupling for connecting said motor to drive either the drill table or the hoist, a source of polyphase alternating-current and means controlled by said coupling for connecting the polyphase winding in star-circuit relation with said source when the coupling is such as to cause the motor to be in driving connection with the drill table, said means being disposed for connecting the polyphase winding in delta-circuit relation with said source when the coupling is such as to cause the motor to be in driving connection with the hoist.

3. An electric motor drive for well-drilling equipment comprising, in combination, a drill table, a hoist, a motor having a polyphase winding, driving means including a coupling for connecting said motor to drive either the drill table or the hoist, a source of polyphase alternating-current and means controlled by said coupling for connecting the polyphase winding in star-circuit relation with said source when the coupling is such as to cause the motor to be in driving connection with the drill table, said means being disposed for connecting the polyphase winding in delta-circuit relation with said source when the coupling is such as to cause the motor to be in driving connection with the hoist, and means for deenergizing the motor winding when the load of the drill table exceeds a predetermined value.

4. An electric motor drive for well-drilling equipment comprising, in combination, a drill table, a hoist, a motor having a polyphase winding, driving means including a coupling for connecting said motor to drive either the drill table or the hoist, a source of polyphase alternating-current, means for connecting the polyphase winding in star-circuit relation with said source, said means being also disposed for connecting the polyphase winding in delta-circuit relation with said source and means controlled by said coupling for insuring that the star-circuit relation is established when the motor is connected to drive said drill table.

5. In a system of control for an electric motor drive for well-drilling comprising, a motor having a three phase winding, a drill table, a hoist, in combination with, driving means including a mechanical coupling for selectively interconnecting said motor to drive either the drill table or the hoist, a source of three phase alternating current, switching means for selectively connecting said three phase winding in delta-circuit relation and in star-circuit relation, means controlled by certain operations of said coupling and said switching means for connecting said three phase winding to said source of alternating current.

6. In a control system for an electric motor drive for well drilling comprising, a motor, a three phase primary winding for the motor, a drill table, a hoist, in combination with, driving means including a mechanical coupling for selectively interconnecting said motor to drive either the drill table or the hoist, a source of three phase alternating current, switching means for selectively connecting said three phase winding in delta-circuit relation and in star-circuit relation, contactor means for connecting said three phase winding to said source of alternating current, control means responsive to the position of said coupling, to connect said motor to the drill table and to the position of said switching means to establish delta-circuit relation for said primary winding to maintain said contactor means open.

7. In a control system, that may be especially useful for well drilling equipment, the combination of: a source of three phase alternating current; a load device, such as a drill table, requiring a relatively small amount of torque for operation; a second load device, such as a hoist, requiring a relatively large amount of torque for operation; a motor; a three phase primary winding therefor; coupling means for causing said motor to deliver torque to either one or the other of said load devices; and means adapted to connect the three phase motor winding in star-circuit relation to said source of current when said motor is coupled to either of said load devices, said last named means being also adapted to connect said three phase motor winding in delta-circuit relation to said source of current, but only when said motor is coupled to the load device requiring the relatively high torque for operation.

In testimony whereof, I have hereunto subscribed my name this 12th day of October, 1931.

ARTHUR LINDNER.